Figures 1, 2, 3, 4, 5:
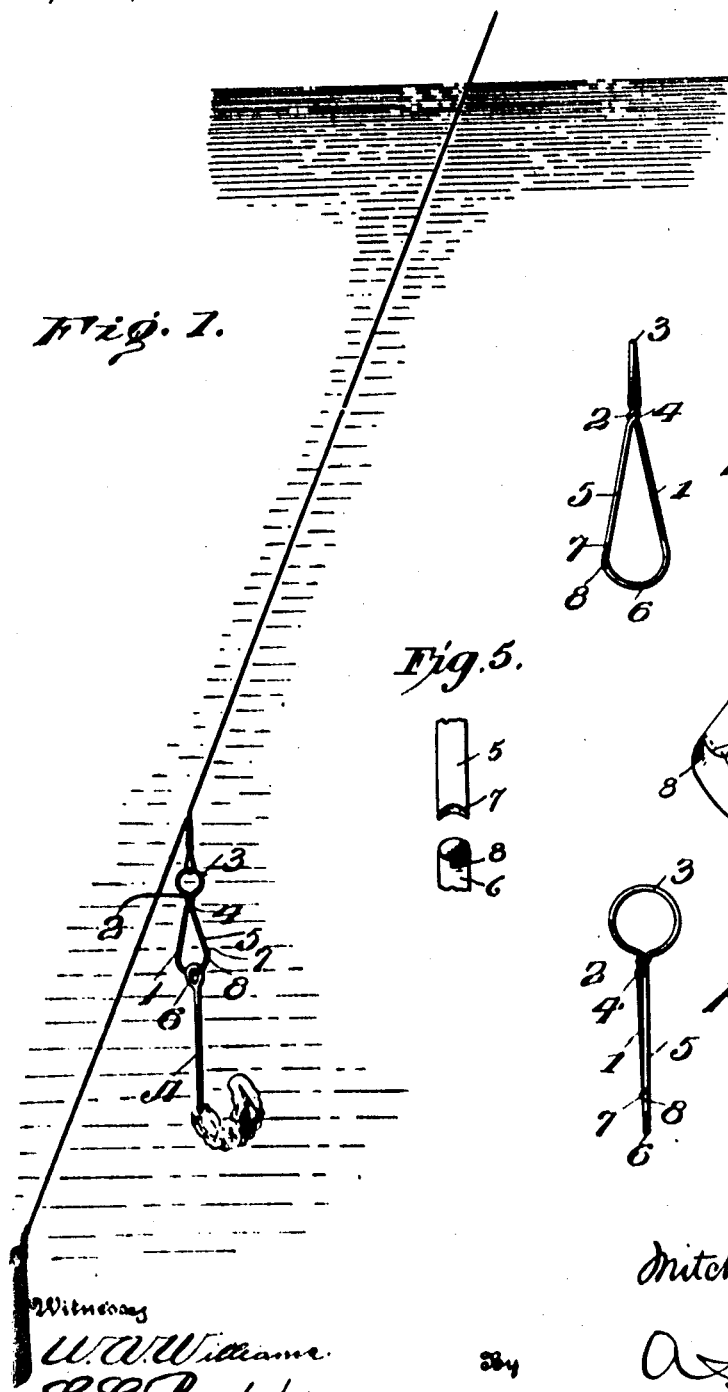

M. LARAMIE.
SNAP HOOK.
APPLICATION FILED JULY 29, 1915.

1,191,009.

Patented July 11, 1916.

Inventor
Mitchell Laramie,

Witnesses

Attorney

UNITED STATES PATENT OFFICE.

MITCHELL LARAMIE, OF WILLIMANTIC, CONNECTICUT.

SNAP-HOOK.

1,191,009.  Specification of Letters Patent.  Patented July 11, 1916.

Application filed July 29, 1915. Serial No. 42,542.

*To all whom it may concern:*

Be it known that I, MITCHELL LARAMIE, a citizen of the United States, residing at Willimantic, in the county of Windham and State of Connecticut, have invented certain new and useful Improvements in Snap-Hooks, of which the following is a specification, reference being had therein to the accompanying drawing.

My invention relates to improvements in snap-hooks, the primary object of which is to devise a simple and inexpensive snap hook which may be rapidly manufactured and sold at a minimum price.

Another object of the present improvement is to devise a snap hook made of one piece and having the jaw so arranged that the coöperating parts thereof will be flush with each other.

A still further object of the present invention is to devise a resilient snap hook made entirely of one piece which is adaptable for use with fish hooks and other fishing tackle.

Other objects and advantages of the said improvement will be set forth in the following specification and drawings in which, Figure 1 is a perspective view of my improved snap hook applied to a fishing line and fish hook. Fig. 2 is a perspective view of the snap hook detached showing the arrangement of the jaw. Fig. 3 is a view taken at right angles to Fig. 2. Fig. 4 is an enlarged fragmentary side elevation of the joint between the bill and guard of my improved hook. Fig. 5 is an enlarged fragmentary edge perspective view of the joint between the bill and guard of my improved hook.

Referring now to the drawings in detail in which like reference numerals designate similar parts, 1 represents the shank of my improved snap hook which is made of wire or any other suitable resilient metal. The shank 1 is twisted upon itself at 2 and upwardly extended and curved to form an eye 3. The lower part of the shank is then bent upon itself again at 4 and extended downwardly to form the guard 5. The opposite end of the shank 1 to that operating as the guard 5, is curved to form a bill 6 of the hook. The end of the guard 5 is cut concave at 7 so as to fit the end 8 of the bill 6 which lies across it and within the concave portion. The end 8 of the bill 6 is also rounded so as to be in the same plane as the outside of the guard 5. Due to this construction the joint when closed forms a practically continuous wire. In this way the joint between the ends 7 and 8 of the guard 5 and the bill 6 is perfectly smooth and will not catch into any substance adjacent to it as is often the case in snap hooks now in use. Attention is particularly directed to the fact that the shank 1 is twisted upon itself once and a half, whereby both the wire which forms the guard 5 and which forms the shank 1 are twisted upon each other. Due to this construction there is a positive lock where the two twists 2 and 4 occur, and the resiliency of the guard 5 is not accomplished by any fulcrum movement over the shank 1, as is the usual form of construction in snap hooks. The guard 5 gets its resiliency from the fact that it is bent outwardly and thereby keeping the guard 5 under tension so that its end 7 will always be in engagement with the end 8 of the bill 6.

My improved snap hook is shown in Fig. 1 as applied to a fishing hook to which it is well adapted for the reason that the hook is all in one piece and of light material which will not be cumbersome. The guard 5 of the snap hook is also easily operated so that the fish hook indicated by the letter A may be easily detached from the snap hook when it is desired to do so.

Having thus fully described my invention what I claim and desire to secure by Letters Patent is:

1. A snap hook comprising a piece of round metal wire one and a half times twisted upon itself to form at one end an eye and at its other end a bill and guard, the end of the guard cut concave throughout its entire width, the end of the bill lying across the end of the guard and within the concave portion thereof, the said concave portion extending parallel to the plane of the bill, the end of the bill projecting beyond the side of the guard rounded convex so as to be in the same plane as the outside of the guard whereby the joint between the bill and guard has the appearance of a continuous wire.

2. A snap hook comprising a piece of round metal wire one and a half times twisted upon itself to form at one end an eye and at the other end a bill and guard, the end of the guard cut concave throughout its entire width, the end of the bill lying across the end of the guard at substantially right angles thereto, and within the concave portion thereof, said concave portion extending parallel to the plane of the bill.

In testimony whereof I hereunto affix my signature in the presence of two witnesses.

MITCHELL LARAMIE.

Witnesses:
E. Frank Bugsbee,
E. H. Richmond.